Figure 1:
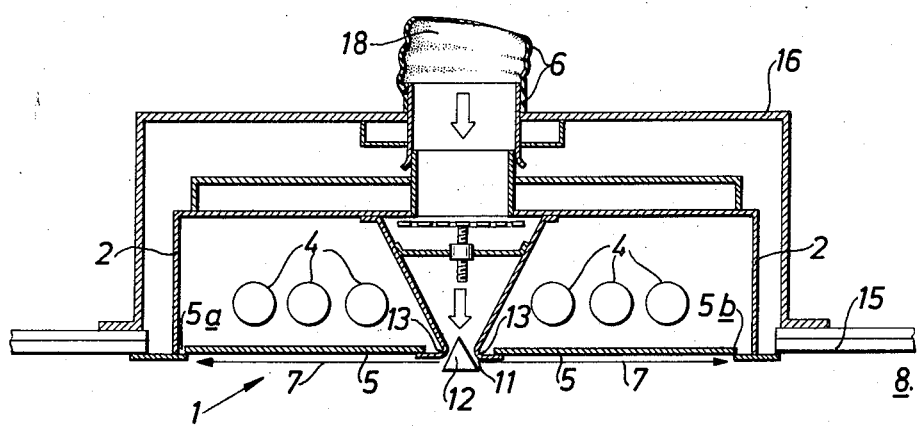

United States Patent
Larkfeldt et al.

[15] 3,693,530
[45] Sept. 26, 1972

[54] VENTILATED FLUORESCENT TUBE FIXTURE

[72] Inventors: Birger Larkfeldt, Genargen 5, 555 90 Odensjo-Barnarp; Rolf Petersson, Harsornsgatan 151, 552 66 Jonkoping, both of Sweden

[22] Filed: Dec. 29, 1971

[21] Appl. No.: 213,665

[52] U.S. Cl. ............98/40 DL, 240/9 A, 240/51.11 R
[51] Int. Cl. ..........F21f 7/00, F21v 33/00, F21s 3/02
[58] Field of Search..........240/9 R, 9 A, 51.11 R, 47; 98/40 R, 40 DL

[56] References Cited

UNITED STATES PATENTS

| | | |
|---|---|---|
| 3,326,112 | 6/1967 | Sadlow et al. ............98/40 DL |
| 3,165,051 | 1/1965 | Archer et al. ............98/40 DL |
| 3,090,434 | 5/1963 | Benson, Jr. et al.....240/9 A X |
| 3,065,686 | 11/1962 | Geocaris ................98/40 DL |
| 2,991,708 | 7/1961 | Falk et al. ..............240/9 A X |
| 2,845,855 | 8/1958 | Burns....................240/9 A X |

*Primary Examiner*—Joseph F. Peters
*Attorney*—Dexter N. Shaw et al.

[57] ABSTRACT

A fluorescent tube fixture having passages for ventilating air in which the passage for supply air is partitioned from the tubes and blows the fresh air across the outer surface of the lens to cool the same, and the passage for exhaust air includes the casing of the fixture so that the exhaust air flows past the fluorescent tubes in the casing.

4 Claims, 5 Drawing Figures

PATENTED SEP 26 1972

3,693,530

SHEET 1 OF 2

VENTILATED FLUORESCENT TUBE FIXTURE

This invention relates to ventilated fluorescent tube fixtures, comprising a box-shaped casing, which includes holding and connecting means for a number of fluorescent tubes, and which is equipped with an antiglare device in the form of a light-transmissive and light-distributing plate or lens covering substantially the opening of the casing and provided with ventilation means for feeding supply air as ventilation air into the room and with second ventilation means for the take-in of stale ventilation air as exhaust air from the room into the casing of the fitting and directing the exhaust air through the casing past said tubes for the removal of excess heat and for cooling the fluorescent tubes to an evacuation opening connected to the ventilation system of the room.

It is known previously to utilize the exhaust air for removing excess heat and for cooling fluorescent tubes, in such a way that the necessary ventilation air for the room is fed into the room as supply air near the fluorescent tube fixtures, which often are mortised in a separate sub-ceiling constituting the visible ceiling of the room, and the ventilation air after its use is conducted away as exhaust air through ventilation means mounted on or adjacent the fluorescent tube fixtures. The fluorescent tubes have proved to have the highest luminous efficiency when the air surrounding the tubes has a temperature of about 20° C. It was found possible, by a suitable design of such ventilation of fluorescent tube fixtures, whereby simultaneously a cooling of the fluorescent tubes takes place so that the luminous flux can increase by up to 30 – 40 percent and the desired coloring shade of the light can be ensured. Ventilated fluorescent tube fixtures of the kind here referred to often are installed in very great numbers, particularly in hospital wards and offices where, thus, the heat load can be reduced substantially, and to some extent also the number of fixtures. It was found that, due to the large air quantities thereby flowing around the fixture, the ceiling is subjected to heavy dirtying, which results in a reduction of the reflecting power of the ceiling surface. This disadvantage thereby implies a decrease of the lighting effect of the great number of fluorescent tube fixtures.

The present invention, which has as its object an improved design of ventilated fluorescent tube fixtures without the aforesaid disadvantage, has proved to bring about the additional advantage of exposing the plate or lens to a certain cooling whereby also the air closest to the lens underlying the fluorescent tubes is cooled. This augments the temperature correction for optimum working temperature resulting from conventional ventilated fluorescent tube fixtures. The ventilated fluorescent tube fixtures according to the invention are characterized in that the ventilation means for supply air to the room is one or two slots surrounded by projecting strips or guide surfaces, or an open slot in which is mounted a movable body for feeding the supply air between the edge lines of the slot and the body, in such a manner that the supply air is caused to sweep and cool the outer surface of the lens and to continue out into the room whereafter it is collected in the second ventilation means for take-in of the stale ventilation air as exhaust air, and that said last mentioned means for the exhaust air is a slot provided with a dust shield and extending along one lateral edge of said lens, which preferably is made of glass, plastic or another material.

An expedient embodiment of the arrangement is characterized in that the ventilation means for the supply air comprises one or two slots located at one or two opposed lateral edges of the casing, the supply air being directed to the center of the lens, and that the second ventilation means for the exhaust air device comprises a slot between one lateral edge of the casing and said lens.

As a preferred embodiment the ventilation means for the supply air is a slot located along a central line of the plate, in which slot is mounted a preferably tapered body adapted to be lifted and lowered and, respectively, to be moved to one side, which body forms with the edge lines of the slot two guide surfaces for the supply air directed to two opposed lateral edges of the lens.

An embodiment of the arrangement intended for rooms provided with so-called exhaust air vents is characterized in that the fitting is provided with double exhaust air connections — one connection from the exhaust air vents and one to the exhaust air ventilation system — and thereby simultaneously constitutes a part of the passageway system for the exhaust air, the lens preferably being designed to seal completely against the casing.

The invention is described in greater detail in the following, with reference to the accompanying drawings showing by way of example alternate embodiments of the invention.

Figure 2:
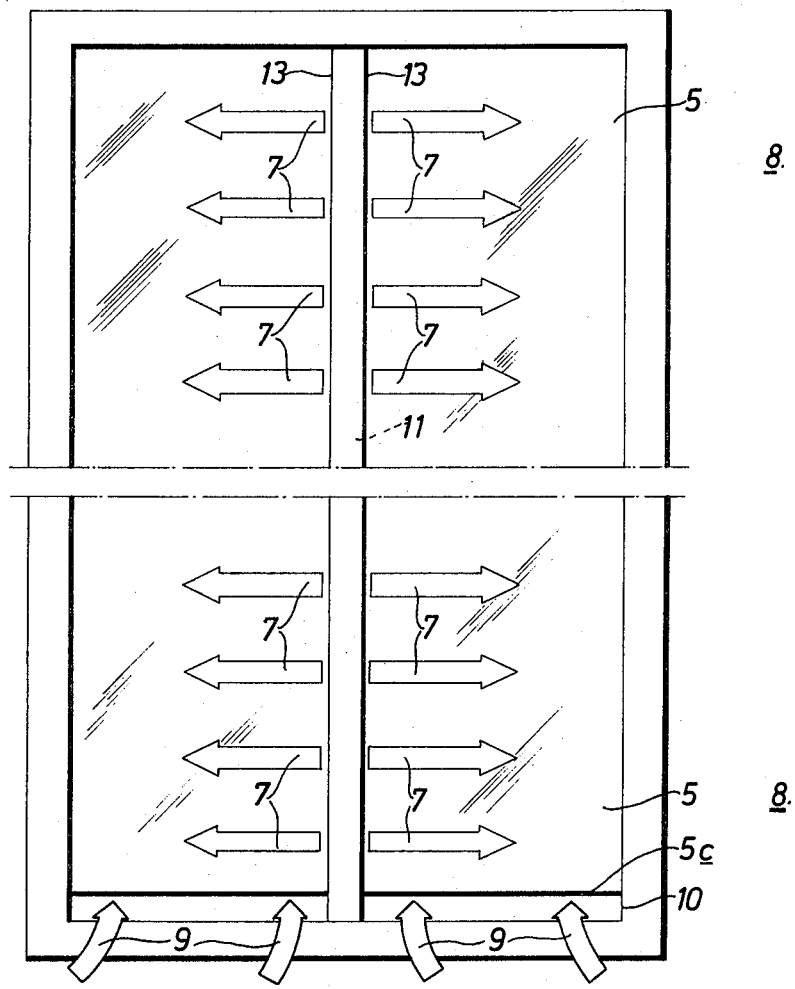
Figure 3:
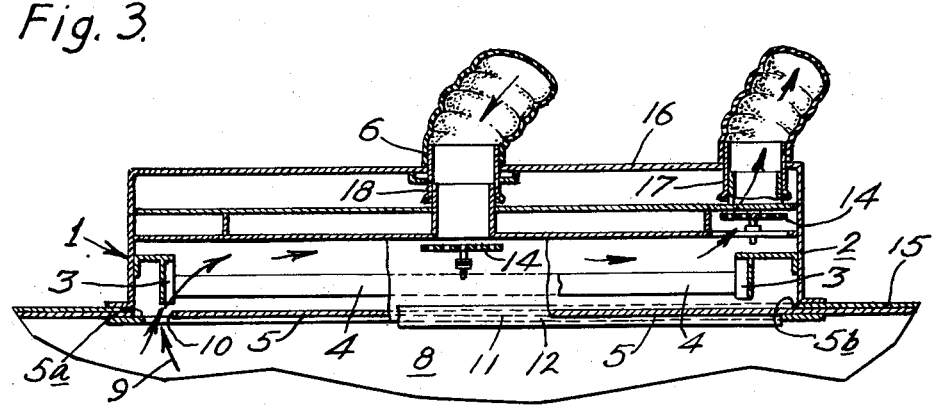
Figure 4:
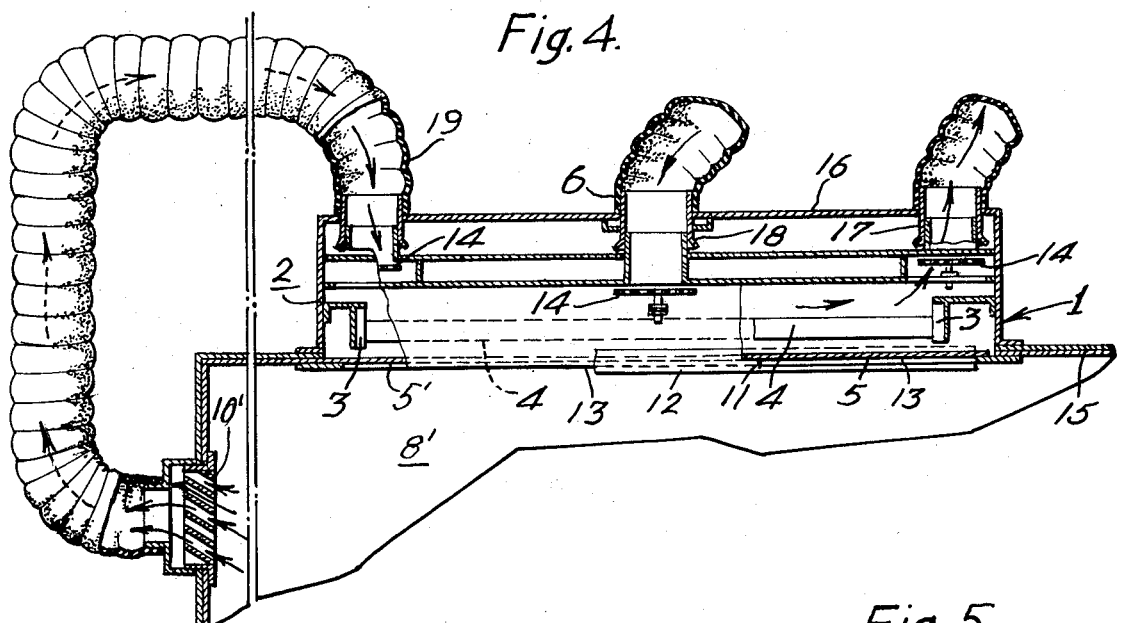
Figure 5:
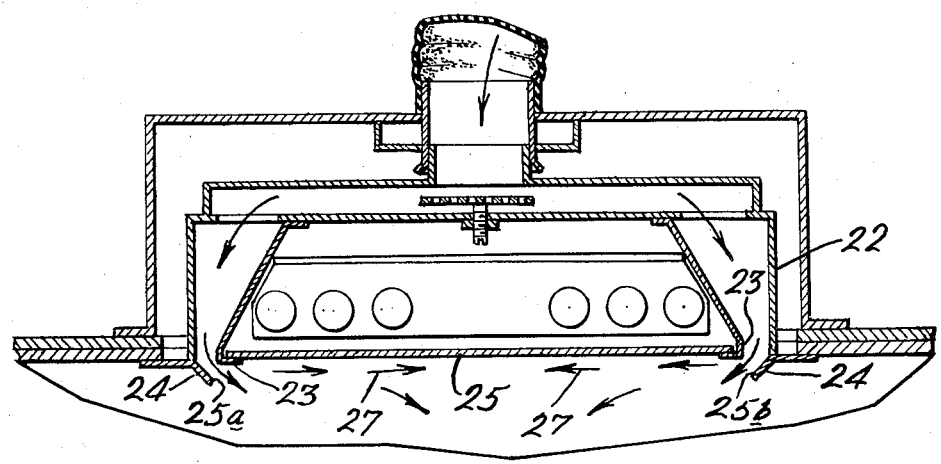

FIG. 1 is a transverse cross-section through a ventilated fluorescent tube fixture, in which a ventilation means is mounted along a central line of a lens closing the casing, FIG. 2 illustrates the fixture as seen from the room below, FIG. 3 is a longitudinal cross section with portions broken away to more clearly show the operation of the fixture, FIG. 4 is a view similar to FIG. 3 showing a modification employed when the room is built with exhaust vents, and FIG. 5 is a view similar to FIG. 1 showing a modification in which the supply air is directed toward the center of the lens.

In the embodiment of FIGS. 1 – 3, the reference numeral 1 designates collectively the novel and improved design of a ventilated fluorescent tube fixture, which comprises a box-shaped casing 2 covered by an antiglare means in the form of a light-transmissive and light-distributing plate or lens 5 of glass, plastic or another material. The casing 2 includes holding means 3 and connection contacts for a number of fluorescent tubes 4. Fluorescent tube fixtures of the kind here referred to often are installed in a great number mortised in a sub-ceiling 15. A carrying bracket 16 for the fixture is preferably mounted in place during the building period along with the conduits on hoses 17 and 18 connected by stationary passageways to a ventilation unit, which often is arranged centrally. 6 designates a ventilation means for feeding supply air into the room. In the embodiment shown the ventilation means is designed as a slot 11, in which a movable body 12 is mounted between the slot edges designated by 13 and the body 12 for feeding supply air at such a speed and with such a throw length that the supply air, as indicated by the arrows 7, is caused to sweep across the lens 5 and to continue past said lens out into the room 8. One object of the invention is that the supplied ventilation air on its way along the lens 5 cools the lens and the fluorescent tube portions facing said lens 5, and that dust particles taken along by the air are given time to deposit on said lens, since it was found at conventional supply air means that the heaviest dirtying usually occurs immediately adjoining the supply of the ventilation air. The dirt, thus, is collected on the lens 5, from which it can be easily removed at suitable intervals by a moist rag. The reflection power of the ceiling surface can now be made use of in a better way, and the lighting effect of the fluorescent tubes can be better utilized, improving the light economy. The invention exploits the fact that "water is cheaper than watt", the lens being washed more easily than the ceiling. The second ventilation means 10 is for taking in the stale ventilation air from the room 8 as schematically indicated by the arrows 9 in FIGS. 2 and 3. In the embodiment shown in FIGS. 1 to 3, the reference numeral 11 designates a slot located along a central line of the plate, and 12 designates a preferably tapered body in the form of a prism. Said body is adapted to be lifted and lowered, or it may also be displaceable to one or the other side, and it forms with the edge lines 13 of the slot two guide surfaces acting according to the invention. The adjusting mechanism may be conventional and is not shown. Said surfaces are intended to direct the supply air to the opposed lateral edges 5a and 5b of the lens 5 as indicated by the arrows 7, parallel to the sub-ceiling 15 in the room 8. A pipe socket 17 is connected to exhaust air passageways, which are presupposed to be connected to the ventilation installation. 16 is a mounting bracket for the fluorescent tube fixture. 18 designates a pipe socket for connection to a supply air passageway. All pipe sockets preferably are provided with adjustable slide damper means 14. In this embodiment the air is exhausted from the room 8 through the slot 10, through the casing 2 along and past the tubes 4, and out the socket 17.

In the embodiment shown in FIG. 4, the parts are the same but the lens 5' is extended to close the slot 10. An additional pipe socket 19 open into the casing 2 at the left-hand side and is connected to an exhaust air passageway extending from a vent 10' in the room 8'. In this manner the exhaust air is directed to the central ventilation installation through the vent 10', through the casing 2 along and past the tubes 4, and out the socket 17.

The other modifications are possible, for example, as shown in FIG. 5, the ventilation means for the supply air may be slots 25a or 25b located at the lateral edges of the casing 22, the second ventilation means for the exhaust air simultaneously being similar to the previously described embodiments. Air as directed between the walls 23 and guide surfaces 24 from a supply 26, the supply air being directed to the center of the lens 25 as indicated at 27.

We claim:

1. A ventilated fluorescent tube fixture for the ceiling of a room having a ventilation system comprising a box-shaped casing, which includes holding and connecting means for a number of fluorescent tubes, an antiglare device in the form of a light-transmissive and light-distributing lens substantially closing the opening of the casing, ventilation means partitioned from said tubes for feeding supply air directly through said casing to the room, and exhaust means for taking into the casing of the fixture stale ventilation air as exhaust air from the room and directing the exhaust air through the casing past said tubes for the removal of excess heat and for cooling the fluorescent tubes, including an evacuation opening connected to the ventilation system for the room, characterized in that the ventilation means for the supply air to the room comprises at least one slot having a guide surface to cause the supply air to sweep and cool the outer surface of the lens and to continue out into the room for subsequent collection by the exhaust means for the stale ventilation air.

2. An arrangement according to claim 1, characterized in that the supply air slot is located along at least one lateral edge of the casing, the supply air being directed to the center of the lens.

3. An arrangement according to claim 1, characterized in that the supply air slot is located along a central line of the lens in which slot is mounted a preferably tapered body adapted to be lifted and lowered and moved to the side, said body with the edge of the slot forming two guide surfaces for directing the supply air toward two opposed lateral edges of the lens.

4. An arrangement according to claim 1 intended for a room equipped with an exhaust air vent, characterized in that the fixture is provided with double exhaust air connections, one connection from the exhaust air vent and one connection to the exhaust air ventilation system, whereby said connections and said casing constitute a part of the passageway system for exhaust air from said vent, and that the lens seals completely against the casing.

* * * * *

UNITED STATES PATENT OFFICE
CERTIFICATE OF CORRECTION

Patent No. 3,693,530                Dated      9/26/72

Inventor(s) Birger Larkfeldt and Rolf Petersson

It is certified that error appears in the above-identified patent and that said Letters Patent are hereby corrected as shown below:

In the heading, add the following reference:

[30] Foreign Priority Data

January 5, 1971    Sweden.........75/71

Signed and sealed this 13th day of February 1973.

(SEAL)
Attest:

EDWARD M.FLETCHER,JR.           ROBERT GOTTSCHALK
Attesting Offider                  Commissioner of Patents